June 19, 1945. LE ROY B. FRASER ET AL 2,378,545
METHOD OF AND APPARATUS FOR TESTING GUNS AND CORRECTING GUN-SIGHTS
Filed June 30, 1943 4 Sheets-Sheet 1
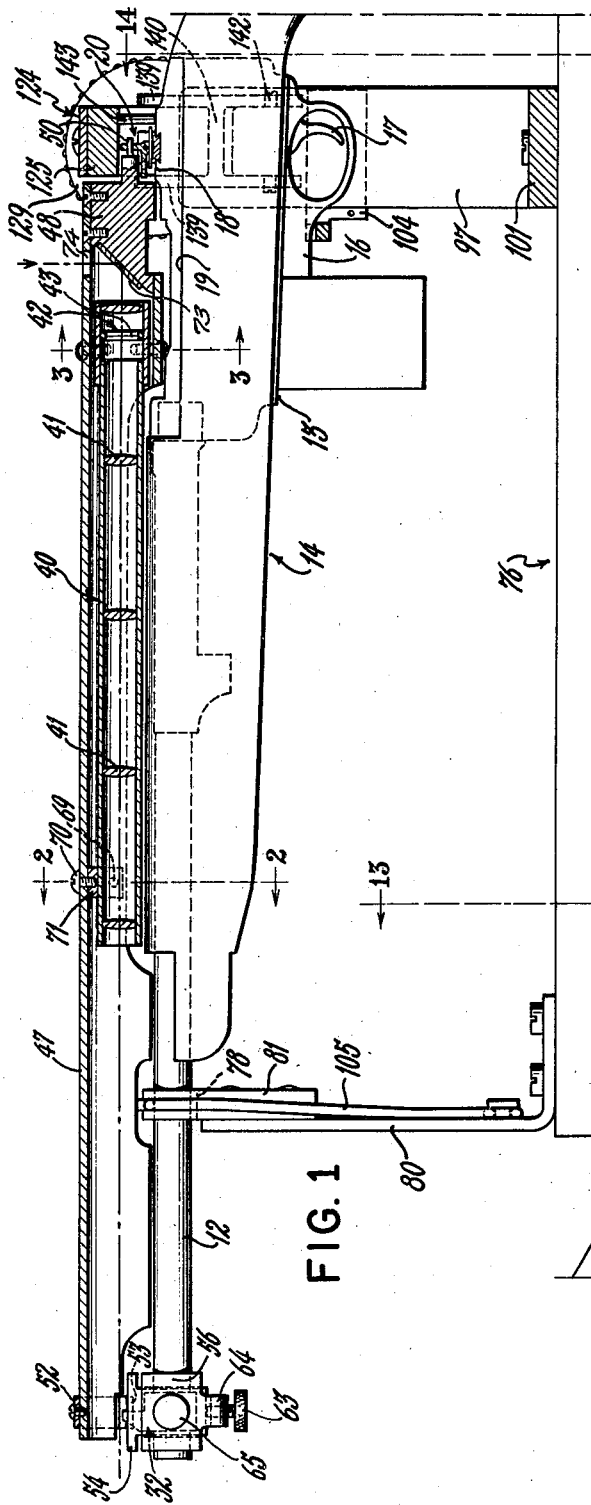
FIG. 1
FIG. 1A
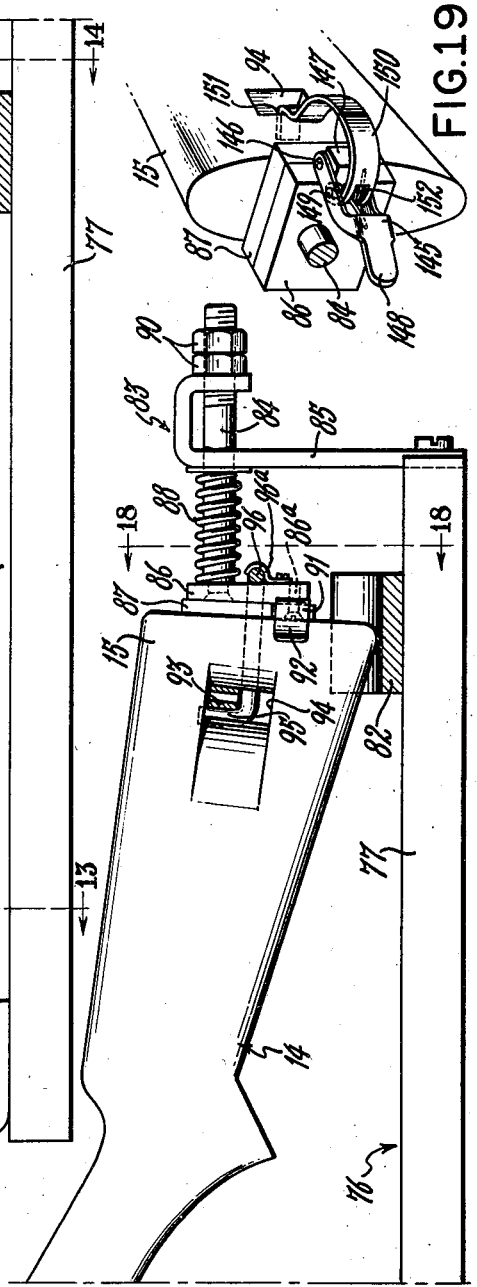
FIG.19
INVENTORS
LeRoy B. Fraser
Edgar D. Lambert
BY
ATTORNEY

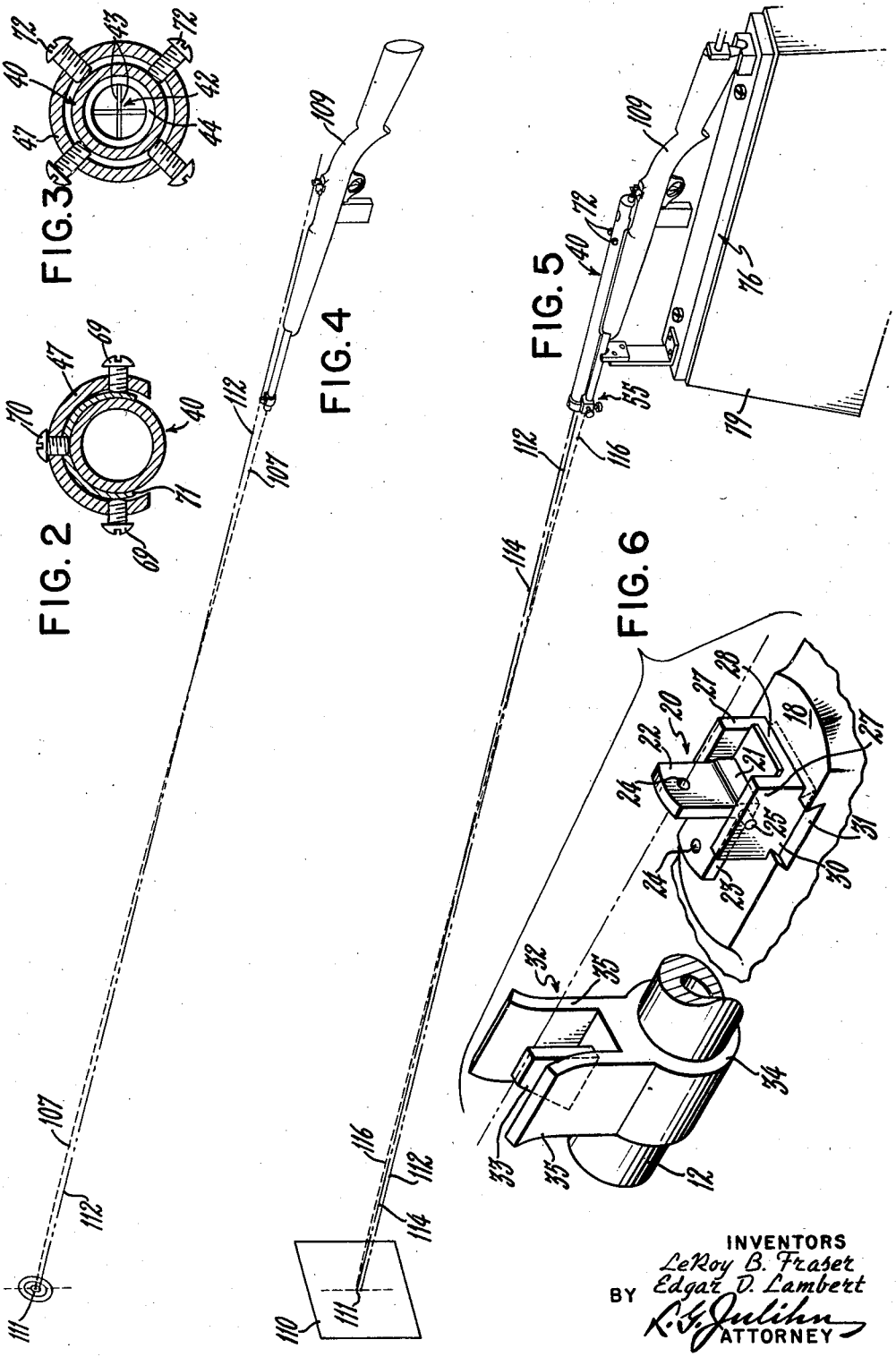

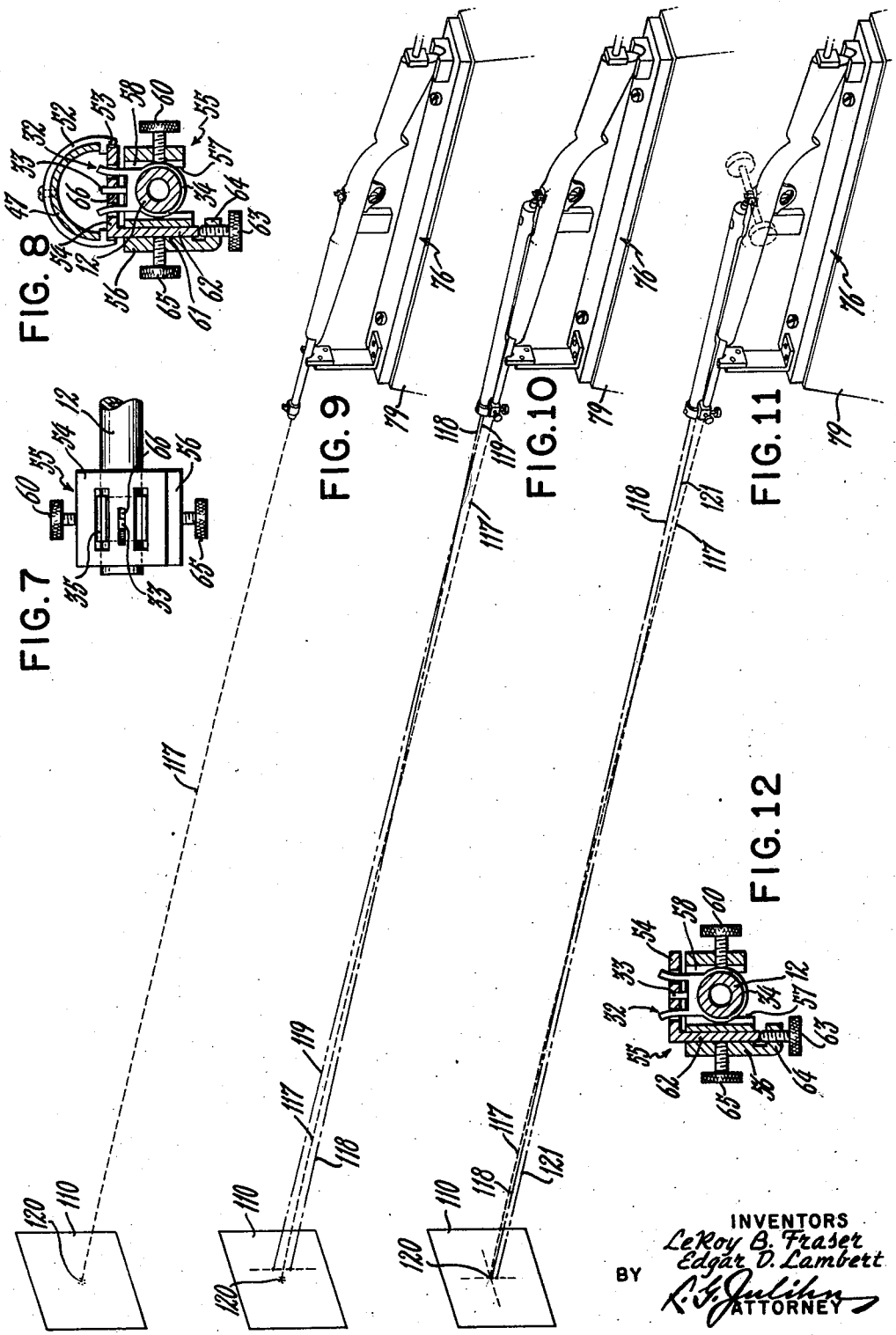

June 19, 1945. LE ROY B. FRASER ET AL 2,378,545
METHOD OF AND APPARATUS FOR TESTING GUNS AND CORRECTING GUN-SIGHTS
Filed June 30, 1943 4 Sheets-Sheet 4
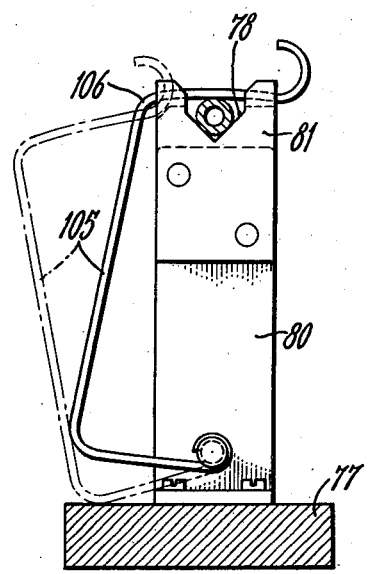
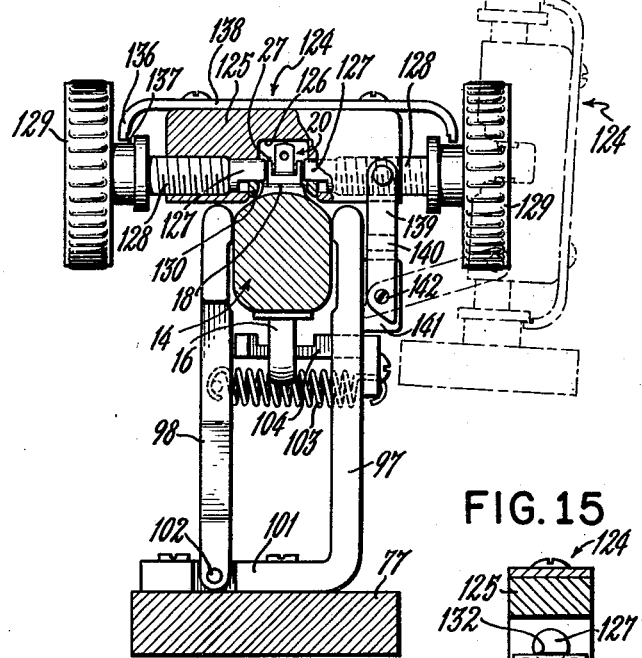
INVENTORS
LeRoy B. Fraser
Edgar D. Lambert
BY
ATTORNEY Patented June 19, 1945

2,378,545

UNITED STATES PATENT OFFICE 2,378,545

METHOD OF AND APPARATUS FOR TESTING GUNS AND CORRECTING GUN SIGHTS

Le Roy B. Fraser, Woodbridge, and Edgar D. Lambert, West Hartford, Conn., assignors to Underwood Elliott Fisher Company, New York, N. Y., a corporation of Delaware Application June 30, 1943, Serial No. 492,960

22 Claims. (Cl. 89—1)

This invention relates to methods of and apparatus for testing guns and correcting gun-sights.

Most all guns have two sights which, for aiming the gum, are brought into alignment with the object or target, one sight being usually near the muzzle end of the gun, and another in the vicinity of the receiving or loading end of the barrel.

It is the usual practice of gun manufacturers to employ sharpshooters to adjust, file, bend or otherwise condition the sights in accordance with the shooting error discovered by taking aim at a target by means of the unadjusted sights, and firing trial shots. Such procedure is expensive and unsatisfactory, as it requires highly skilled labor, and necessitates many trial shots and many trial adjustments before the desired adjustment or correction is finally obtained.

According to the invention, the proper gun-sight conditions are quickly and conveniently determined for each individual gun, by associating gun-sight defining means therewith, and adjusting such means relatively to the gun to describe a certain relation to means representative of the gun-trajectory. Furthermore, location analyzing means for said sight-defining means, in cooperation with the trajectory-representative means, facilitate quick and precise adjustment of the sight-defining means to the proper position. In effect, the correct gun-sight conditions are established for each individual gun with definite regard to the gun-trajectory and, as will herein become evident, the entire procedure of sighting the guns is simple, quick, definite, accurate, direct and final.

From the foregoing it will be seen that it is a primary object of the invention to provide a method and means for conveniently, accurately, and expeditiously correcting or conditioning gun-sights.

Another object of the invention is to devise a method and apparatus which facilitates accurate sighting of guns by relatively unskilled persons, particularly such that are not sharpshooters.

Also an object of the invention is to provide for proper sight-adjustment of guns by a number of definitely defined, simple and accurate steps, in differentiation of the conventional cut and try procedure.

It is furthermore an object of the invention to devise efficient means, facilitating the adjustment or correction of gun-sights by establishing for each gun a trajectory-representation and ascertaining proper sight conditions for the gun by reference to said trajectory-representation.

Another object is to determine the correct locations of the gun-sights in accordance with the foregoing objects by use of efficient position-analyzing or scanning means which, in cooperation with said trajectory-representation serves to determine the exact required adjustment of the gun-sight defining means.

It is furthermore an object of the invention to provide an efficient method and means for function-testing and sighting guns which requires a minimum expenditure of ammunition.

Another object of the invention is to provide in combination with the gun-sight correcting means a device, whereby such guns which scatter the missiles over an objectionably wide target-area are conveniently detected for rejection.

Also an object of the invention is to provide as part of said gun-sight defining means a leveling gage for one of the sights.

Still another object of the invention is to provide an efficient device for forcibly shifting gun-sights without disturbing influence to the gun which is being sighted.

Many other objects and features of the invention will be apparent upon consideration of the detailed description which follows as that description is read in the light of the accompanying drawings.

The invention is shown and described in connection with a U. S. Army Carbine No. M1, but, as will become evident hereinafter, is clearly applicable also to other types of guns which have gun-sights.

As has been stated hereinbefore, the gun-sight correction is determined so that the sights will bear a certain relation to a trajectory-representation. For utmost accuracy such representation may be best established by mounting the gun, and projecting a number of shots against a sheet to record thereupon a number of points, the mean striking point being then representative of the trajectory of the particular gun. The sights are then adjusted or corrected by the aid of said aforementioned sight-defining means with specific regard to said mean striking point, the sight-defining means being adjustable relatively to the gun and the proper adjustment being determined by position analyzing means therefor, which, according to the form of the invention shown, may be in the form of a telescope equipped with a location or direction finder and which, together with the sight-defining means, may be termed a telescopic device.

Referring now to the accompanying drawings, Figs. 1 and 1A are composite views showing a U. S. carbine placed upon a mount and said telescopic device placed upon the carbine, for the purpose of sighting the sights thereof.

Fig. 2 is a cross-sectional view of the telescope and a housing or frame therefor, taken on line 2—2 of Fig. 1, and showing the manner of support of the front-end of the telescope within the housing.

Fig. 3 is a cross-sectional view of the telescope and its housing taken near the rear-end of the telescope along line 3—3 of Fig. 1, and depicts devices for adjusting the telescope within said housing.

Fig. 4 illustrates a perfectly sighted carbine, which henceforth will be referred to as the master gun, aimed at the 6 o'clock peripheral point of a bull's-eye, and further illustrates the trajectory of the gun as entering the center of the bull's-eye.

In Fig. 5, the master gun of Fig. 4 is shown in a mount and the telescopic device to be used for determining proper sight conditions for other guns adjusted so that the location finder of the telescope is in optical registration with the shot-spot of the target sheet.

Fig. 6 is a fragmental perspective view of the carbine showing the details of the front and rear sights of the carbine.

Fig. 7 is a plan view of a leveling or filing gage fixture for the front-sight applied to the gun proximate the front-sight.

Fig. 8 is a cross-sectional view of the filing-gage fixture of Fig. 7, showing the telescope housing resting thereupon.

Fig. 9 depicts a stock gun of the same manufacture as that of Figs. 4 and 5 placed in a mount and fired at a recording surface or sheet, the sheet having recorded a number of shots.

In Fig. 10 the telescope has been placed upon the stock gun of Fig. 9 for purposes of analyzing the sight correction necessary for that gun.

In Fig. 11 the telescopic device has been adjusted into directional registration with a recorded striking point and the corrected sights are accurately defined in a specific directional relation to said recorded striking point.

Fig. 12 is a view of the filing-gage fixture, similar to Fig. 8, but the telescope with its frame support has been removed and the front-sight filed flush with a gaging surface.

Fig. 13 is a vertical section taken on line 13—13 of Fig. 1 and depicts mainly a portion of the gun mount which supports the gun-barrel.

Fig. 14 is a sectional view taken on line 14—14 of Fig. 1, illustrating a gun-clamp and a sight shifting device.

Fig. 15 is a section taken transversely through the middle of the sight shifting device.

Fig. 16 shows a sight-shifting screw and operatively connected parts.

Fig. 17 illustrates in perspective, and separated from each other, two main parts of the filing-gage fixture.

Fig. 18 is a sectional view taken along line 18—18 of Fig. 1A and depicts mainly certain gun-supporting and anchorage devices at the stock-end of the gun.

Fig. 19 shows an alternate structure of means whereby the rifle is resiliently anchored to a movable recoil head of the gun-mount.

Inasmuch as the invention is illustrated in connection with U. S. Army Carbine M1, it is thought best to describe first this weapon so far as it is believed to be of aid in understanding the invention.

Description of gun

The said carbine or rifle comprises mainly, a steel barrel 12, a cartridge receiver 13, with which the barrel 12 forms a unit, and a wooden stock 14 wherein the barrel 12 and the receiver 13 is bedded, the stock having an end comprising a shoulder piece or butt 15. The receiver 13 carries a usual trigger housing 16 protruding below the stock 14, the housing including a trigger-guard into which the usual trigger 17 extends. The top of said stock 14 has an opening 19, exposing a portion of the receiver 13 including a platform or rise 18 whereon a rear sight generally designated by reference numeral 20 is supported. This rear sight is best seen in Fig. 6 and consists of a hinged piece 21 having two ears 22 and 23 branching at right angles from each other, each ear having a small peep hole 24. The said piece 21 is hingedly carried by means of a pivot pin 25 between two uprights of a generally U-shaped block 28 which has at its bottom a dovetail 30 fitting tightly a dovetail way 31 provided in the receiver platform 18. The piece 21 consisting of the two sight ears 22 and 23 is swingable to bring either of the ears 22 and 23 to perpendicular position with respect to the rifle barrel, there being a spring leaf underlying and cooperating with the hinged piece 21 to detent it in either position. As may be seen from Figs. 1 and 6, the peep hole in the ear 23 is farther from the pivot pin 25 than the peep hole in the ear 21, which signifies that if aim is taken through the peep hole in the ear 23, in conjunction with a front sight 32, the rifle will be aimed higher than if aim is taken through the peep hole in the ear 22. This is to allow for the drop of the projectile when fired at a more distant object, and, as a matter of fact, the peep holes in the ears 22 and 23 are located respectively for taking aim at objects that are 100 and 300 yards distant. The seat of the dovetail 30 in the way 31 is extremely tight, yet allows transverse shifting of the sight block 28 by application of an abnormal force, thereby to adjust the sight to a correct transverse position.

The front sight 32 consists of a sight blade 33, being integral with a collar 34 fast on the muzzle-end of the barrel 12, and extending radially from the barrel. To protect the sight blade 33 from injury, sight guards 35 branch from the collar 34 to either side of the sight blade.

In the case of the carbine just described, the U. S. Army requires that at a range of 100 yards, in order that the bullet strike a 5-inch bull's-eye, the gun be sighted properly to require aim to the 6 o'clock peripheral point of such bull's-eye. Heretofore, to obtain such performance the sights of the guns were corrected by sharpshooters who, in accordance with the error of the sights, indicated by firing trial shots at a target, made transverse shifting adjustments of the rear sight and filed the front sight down to the required level. As these adjustments had to be made at random, the process of firing trial shots and making adjustments to the sights had to be repeated many times, and often fifteen or more rounds of ammunition had to be fired before the gun was satisfactorily sighted. This involved an expenditure of valuable man-hours besides the great waste of ammunition. Furthermore, a gun must be limbered up before it is in suitable condition, that is, before it has the proper feed for the sharpshooter to take aim and fire for the purpose of making said adjustments. It has been the practice to effect such limbering by firing fifteen rounds into a sand pit. Thus each carbine required an average expenditure of nearly thirty rounds of ammunition to get it into sighted condition.

According to the illustrated form of the invention, the gun sights are conveniently, accurately, and expeditiously adjusted or conditioned by use of a telescopic device embodying sight-defining means and it is believed best for an understanding of the invention to describe first this device and the means for associating it with the aforesaid described carbine for the assigned purpose.

*Telescopic device*

Referring thus particularly to Fig. 1, a telescope is designated by the general reference character 40 and comprises a number of lenses 41 and a spot or location finder 42, see Figure 3, supported within the tube of the telescope 40, the spotfinder being preferably in the form of two pairs of parallel, thin wires 43 stretched across each other to describe a small rectangular frame or mesh and being arranged in a plane where the image of the object, that is the image of the target, is formed between the two lenses 41 which are farthest away from the target. The cross wires are stretched across and anchored in a ring 44 fast within the tubing of the telescope 40. In turn the telescope is supported within a housing 47 consisting of a tube, one end of which is closed by a plug 48 having a pin 50 projecting axially therefrom. Portions of the tube 47 are variously cut away as shown in the drawings so as to afford clearance between the housing 47 and the carbine and permit adjustment of the housing on the gun. At the end opposite to said plug 48, the tube 47 has fixed thereto, by screws or otherwise, an arcuate fitting 52 provided with opposite interior recesses 53 extending lengthwise of the telescope, see Fig. 8. The telescopic device comprising the telescope 40 and tubular housing 47 is adapted to be placed upon the carbine by first inserting pin 50 in the peep hole 24 of the rear-sight ear 22 and then seating the fitting 52 upon a platform 54 which constitutes a part of a fixture 55 adapted to be clamped to the gun barrel 12 proximate the front sight 32. It will be seen from Fig. 8 that, by reason of said recesses 53, the said fitting 52 provides for definite horizontal and vertical association of the telescopic unit with the platform 54 at the region of the front sight 32. Furthermore, it should be observed that the recesses 53 are such as to afford convex engaging surfaces with the sides of the platform 54, to thus allow some adjustment of the telescopic device horizontally about the platform.

The clamping fixture 55 is clearly illustrated in Figs. 8 and 17, and comprises a main body or block 56 which can be placed upon the barrel, proximate the front sight 32, and which has a rectangular central clearance 58 to accommodate the sight collar 34. On the under side, the said body 56 is cut out at 57 in order to allow it to be set down upon the barrel 12. To secure the block 56 on the barrel a thumb screw 60 carried on said block is adapted to be screwed against the collar 34. On the side opposite to the screw 60 the block 56 has a vertical rectangular hole 61 provided therein, into which there fits, vertically slidable, a leg 62 that is integral with the platform 54. The said leg 62 rests by gravity upon a screw 63 threadedly carried in a boss 64 of the block 56, and when the said screw is turned, the platform will raise or descend. The platform has an opening 66 just wide enough for the sight blade 33 to extend therethrough, but it will be seen from Fig. 7 that the length of the opening is excessive. Therefore, the sight blade 33 determines the exact radial position of the clamping fixture 55, including said platform 54, upon the rifle barrel, but allows some leeway as to the axial position of the clamping device on the barrel.

As hereinbefore stated, the telescope 40 is fixedly carried within a tubular housing 47, and to this end the latter has secured within it, by means of a screw 70, to the top thereof, near the object-end of the telescope, an arcuate member 71 which partially surrounds the telescope 40, see Fig. 2. The arcuate member stands slightly away from the tubular housing at each side of the telescope, and for clamping it and, in turn, the object-end of the telescope firmly within the tubular housing 74, there are two opposite screws 69 threaded into the housing which are firmly set against the arcuate member. At the other end of the telescope the housing 47 has, as seen in Fig. 3, four set-screws 72 at radially equally spaced locations bearing against the telescope so that at this end the telescope may be adjusted radially in any direction within the tubular housing by variously adjusting the screws 72. When finally adjusted, the screws 72 are all driven tightly against the telescope and act to lock each other.

As seen in Fig. 1, the plug 48 obstructs a straight view through the telescope, but a mirror 73, fast upon an angular, interior face on the plug, reflects the object-image, together with the location finder 42, upwardly through a hole 74 in the housing 47.

The extent of adjustment to be made to the rifle sights 20 and 32 is determined by first firing a few rounds of ammunition at a blank target with the carbine or rifle held in a mount, generally designated by the reference character 76, and then shifting the rear sight 20 and rear end of the telescopic device and raising or lowering the front end of the latter, until the mean point at which the bullets have struck the target or sheet shows on the mirror centrally of the mesh of the cross wires. However, for the telescopic device to serve the assigned purpose, the direction-indicating axis of the telescope, as defined by the cross wires 43 with reference to the image at the cross wires, must be located properly with respect to the means of association of the telescopic device with the gun-sights 20 and 32, which, in the specified embodiment of the invention is with respect to the peep hole in ear 22, the platform 54, and the plane in which the front sight blade 33 lies. This is best done by the aid of a carbine or gun which has been accurately sighted and proven perfect in performance by one or more sharpshooters.

*Gun mounting means*

Before, however, explaining the manner in which the direction-finding axis of the telescope is adjusted with reference to a master rifle, the details of the mount or rest 76 will be described. Thus referring to Figs. 1, 1A, 13, 14 and 18, the mount comprises mainly a base 77 bolted upon a rigid stand 79, preferably consisting of a heavy concrete block standing on a floor. From one end of said base rises, fastened thereon, a bracket 80 headed by a block 81, in a V-groove 78 of which the barrel 12 of the rifle is adapted to be laid. At the other end of the base there is fastened thereupon a block 82 having a V-groove wherein the shoulder piece 15 of the gun is adapted to be nested slidably lengthwise of the base 77. Backing up the butt-end of the shoulder piece 15 is a recoil device 83 consisting of a plunger 84 guided in a bracket plate 85 which is bolted to the end of the base 77. The said plunger 84 has a head 86 thereon which is faced by a pad 87 of fiber or the like, against which the butt of the gun is adapted to be positioned. Between the head 86 and the bracket 85 is a strong compression spring 88 which cushions the shock incident to the firing of the rifle substantially in the same manner as a man's shoulder. The spring 88 is normally under tension, and nuts 90 locked against each other on a threaded end of the plunger 84, are instrumental in cooperation with spring 88, to give the head 86 its normal location illustrated in Fig. 1A. To keep the plunger 84 and its head 86 from turning, the head 86 carries a yoke 91 having opposite lateral prongs 92 wherebetween the butt-end of the rifle is laid down. The yoke may be fastened to the head 86 by screws or rivets 86ª which may also fasten the said pad 87 to the head. The purpose of the pad is to prevent injury or marring of the butt-end of the gun, and it will be seen further that under the firing impact of the gun, the head 86, together with the plunger 84, is thrust rearwardly against the resistance of the spring 88 which is substantially that of a man's shoulder against the stock. After the firing pressure has subsided, the rifle reverses its motion under the influence of the spring 88, and in order that the shoulder piece 15 of the rifle may be in contact with the recoil device preceding every subsequently fired shot, the rifle is resiliently anchored to the head 86 by means of a resilient spike 93 which, for its assigned purpose, is introduced in a shoulder-strap-accommodating hole 94 of the gun stock. The spike consists of a doubled up spring leaf and when introduced in said hole cooperates with anchorage hooks 95 extending forwardly from the plunger head 86 at opposite sides of the stock. Said hooks comprise opposite ends of a generally U-shaped member 96 held fast to the back side of the head 86 by a clamp 96ª and fitting recesses 99 in the sides of the head 86.

Flanking the gun stock 14 substantially at the location of the rear sight 20 are two opposite jaws 97, 98 comprising a clamp. The jaw 97 is in the form of a standard which has a flange 101 riveted or otherwise secured to the base 77, while the jaw 98 is hinged by a pin 102 to the flange 101, see Fig. 14. A spring 103 urges the jaw 98 toward the jaw 97, thereby to clamp the gun at its mid section. When no gun is in the mount, the jaw 98 will be drawn slightly closer to the companion jaw, as determined by its engaging the apex of a bracket 104 projecting from and fastened to the jaw 97. As will be seen in Fig. 14, one end of the spring is anchored in a hole of said bracket 104, whereas the other end is attached to a pin on the jaw 98. The upper ends of the jaws are rounded in order that the gun may be readily pressed down between the jaws. Acting on the opposite sides of the gun, where shown, the jaws hold the gun against sidewise tipping about the V-grooves in the blocks 81, 82, but do not suppress lengthwise recoil movement of the gun. The bracket 80 whereon the V-grooved block 81 is carried has pivoted thereto, at a point perpendicularly below the V-groove, a swingable clip 105 formed of heavy spring wire adapted to removably and resiliently hold the rifle barrel seated in the V-groove of block 81. As illustrated in Fig. 13 the said clip 105 has a portion which is guided in a transverse slot of the block 81 and the clip is swingable from a solid-line position to a dot-and-dash line position to facilitate the placing of the guns in the mount. A bend 106 in the clip gives its upper end resilient downward tension on the barrel.

*Conditioning telescopic device by aid of master gun*

As has been hereinbefore stated, the proper direction-indicating axis of the telescope with reference to the sight-defining means, that is the peep sight, the platform 54, and the radial plane in which the front sight blade 33 lies, is best obtained by the aid of a gun which has been carefully sighted and proven perfect by one or several sharpshooters. Such a perfect gun 109, which may be called a master gun, is depicted in Fig. 4 as having a trajectory 107 striking the center of a 5-inch bull's-eye, with the gun 100 yards away, aimed by means of the sights 20 and 32 to the 6 o'clock peripheral point of the bull's-eye, the sight line being indicated by a dot-dot-dash line 112. As a first step towards conditioning the telescopic device for use in sighting other guns, this master gun 109 is placed in a mount such as the aforesaid gun mount 76, see Fig. 5, and a group of shots are fired at a recording sheet 110 also 100 yards away, perforating thus a small area, the central or mean point of which is indicated at 111. The point 111 on the target-sheet of Fig. 5 may thus be said to be representative of the average trajectory 116 of the master gun in relation thereto. Furthermore, it will be seen that the sight line 112 meets the target sheet 110 at a distance below the point 111 which is equal to the radius of the bull's-eye, in conformity to the aforementioned Army requirement. After the several shots have been fired, the clamping device 55 is attached proximate the front-sight of the master gun and the platform 54 is thereafter so adjusted that its top surface is exactly flush with the top or sight-edge of the blade 33. Having done this, the telescopic device is placed upon the gun by first introducing the pin 50 in the peep hole of ear 22 and thereafter seating the front-end of the device down upon the platform 54, it being understood that the recessed arcuate fitting 52 determines the exact location of the front-end of the housing 47 upon the platform. It remains then only to adjust the telescope 40 within the housing 47 to bring its direction-indicating axis indicated by dot-dash line 114 into exact register with the mean point 111 struck by the bullets fired from the master gun. This is done by appropriately adjusting the screws 72 to bring the image of said mean point 111 to view in the center of the mesh or frame formed by the cross wires 43. It may be said that with the telescope so adjusted, its indicated direction relatively to the sight-defining platform 54 and rear-sight-defining pin 50 afford a correct pattern for determining proper gun-sight conditions for other guns. While it has been found most convenient to obtain such pattern by the aid of a master gun, it is to be understood that it may be obtained by measurement, in accordance with calculations, or in any other suitable manner. Perhaps a better understanding of the above phase of the invention is had if it is realized that the correct sights on the mounted master gun, together with the mean shot point made by the mounted master gun, provide a standard or pattern which, if adopted or duplicated for other guns of the same manufacture, provides for proper sighting of such stock guns. Accordingly, the telescopic device and the clamping device 55 having been conditioned to represent a proper gun-sight pattern are then disassociated from the master gun and used for conveniently, expeditiously, and accurately sighting other guns of the same manufacture, in a manner to be described presently.

Actual sighting of stock guns

The guns to be sighted are placed in the aforedescribed mount 76, or a duplicate thereof, at 100 yards from a shot recording sheet, see Fig. 9, and the spring clip 105 is slid over the barrel 12, and the spike 93 is introduced into the hole 94 of the stock. A number of shots are then fired, as a result of which the sheet 110, as depicted in Fig. 9, will receive a number of perforations in an area usually not exceeding five inches in diameter. So far as the new method of sighting the guns is concerned, the number of shots fired need only be one; but in order to give the gun a thorough functional test, and also in order to limber up its mechanism, as well as to comply with a government requirement, 15 rounds are fired. Should any gun be found to scatter the bullets over an area on the sheet that is readily seen to be larger than five inches in diameter, or should any gun be found to function improperly, it is rejected at this point for correction and repair. On each gun thought to perform satisfactorily, the clamping fixture 55 is placed upon its barrel and secured thereon. Following this the telescopic device is placed upon the rear sight 20 and the platform 54 in the manner already described. This step in the procedure is illustrated in Fig. 10, in which the average trajectory is indicated by a dotted line 117 and in which the direction-indicating axis 118 of the telescope is shown to be off with respect to the mean point perforated by the bullets. In said Fig. 10 may also be seen a dot-dot-dash line 119 indicating the line of sight of the yet unadjusted sights, which line and the direction indicating axis point with lateral coincidence upon the sheet 110. It will be observed, however, that as to elevation the locations pointed to have no fixed relation. If now the rear sight 20 and the platform 54 are adjusted horizontally and vertically respectively to bring the perforated area to view centrally of the location finder or frame formed by the wires 43, see Fig. 11, the pin 50 in the peep hole of the rear sight, and the platform proximate the front sight, will define the appropriate sight conditions for the gun. These so defined relations of the front and rear sights of the stock gun with regard to the mean shot point, and therefore also with regard to the location finder, are obviously in conformity with the aforementioned predetermined standard or pattern represented by sights of the master gun in conjunction with the mean shot point obtained from this gun. By stating that the pin 50 and the platform 54 "define" appropriate sight conditions, it is meant that the correct significant locations of the sights are determined or signified, but not necessarily established in fact. Considering the invention in the light of the embodiment of the invention shown and described in detail, the rear sight actually assumes the correct sight position as the pin 50 is shifted to the correct sight defining position. On the other hand the correct significant location of the front sight sight is defined in the sense that the top surface of the adjusted platform determines or indicates the level to which the front sight is required to be reduced or finished. Therefore, if after properly adjusting the rear sight and the platform 54 the front sight blade 33 is filed down flush with the top surface of the platform, both sights of the gun are properly sighted, as desired, and are properly indicative of a line of sight directed at a point two-and-one-half inches below the mean point 120 perforated by the bullets, which is in accord with the aforementioned Army requirement. In other words the correct aiming line of the sights 20 and 32, indicated in Fig. 11 by a dot-and-dash line 121, will then be located exactly the same with respect to the mean point 120 of the perforations as in the case of the master gun 109, which means that the gun sights 20 and 32 are in accurately sighted condition and that the gun is ready for use. The lateral adjustment to the rear sight 20 is made so as to point the direction indicating axis 118 to a location which is laterally coincident with the recorded shot or shots and then the platform 54 adjusted until the said axis is in a relation of registration with the level of the recorded shot. Thus the telescopic device with its location finder constitutes or may be termed a location analyzer for the sight defining pin 50 and the sight defining platform 54. For filing the front sight, the telescopic device is removed from the platform 54, as is depicted in Fig. 12, and, of course, the clamping device is removed from each gun after it has served its purpose.

The square or mesh formed by wires 43 corresponds to a 5-inch square on the target, and since any gun which scatters the bullets over an area in excess of a 5-inch circle is not acceptable, it follows that all perforations on the target must appear in a circle within said mesh, as viewed through the telescope. Said cross wires 43, comprising the location finder and defining a square, serve thus also to determine with certainty whether a gun is to be rejected for the reason of excessively scattering the bullets. While the rectangular frame formed by the cross wires serves its purpose well, it should be understood that a circular frame, properly supported within the telescope, could be used instead.

The leveling platform 54 is made of high-grade steel and its top surface is hardened and polished so that the file used for trimming or leveling the sight blade 32 down will glide over the said surface without affecting it.

It is to be noted that the platform 54 is adjusted by turning the screw 63, and that in preparation to the removal of the telescope and the filing of the front sight, the screw 65 is tightened to render the platform fast upon the gun.

As hereinbefore stated, it has been the practice to shift the rear sight 20 of the illustrated carbine or gun to the desired position by tapping it on either side of the sight block 28. This manner of adjusting is tedious and difficult to control and for that reason a removable sight shifting device 124, comprising, an elongated block 125 having a transverse clearance 126 is provided, wherein, with the device placed upon the gun for use, as seen in Fig. 14, the rear sight 20 is accommodated. Said device 124, when placed upon the gun for use, has pins 127 oppositely facing the uprights 27 of the sight shifting block 28, which pins are forcibly movable by screws 128 having hand wheels 129. The said pins 127 are prevented from turning by bars 130 fastened to said block 125, at the opposite lower corners of the said clearance 126, by screws 131, see Fig. 15, the said pins 127 being flattened at 132 to fit said bars. When the sight shifter 124 is in use, as depicted in Fig. 14, the bars 130 flank closely the rise or platform 18 of the receiver 13, and the flattened sides 132 of said pins are at a higher elevation than the top surface of said rise 18, wherefore, if either screw 128 is turned to advance its associated pin 127, the entire sight 20 will be forcibly shifted transversely of the gun after the block 125 has come into contact with that side of said rise 18 which is opposite to the pin moved. Thus by manipulation of the two screws 128, the rear sight 20 can be shifted conveniently and quickly to the exact position desired. The said pins 127 have reduced portions 133 which fit socket holes in the screws 128, and in the socket holes are hard steel-balls 134 which transmit the thrust to the pins 127. So that each pin 127 will withdraw outwardly when its associated screw is turned outwardly, each screw 128 has a retaining pin 135 extending into an annular groove 135ª of the associated pin 133. Adjustments of the screws 128 are confined to limits controlled by stops 136 entering annular grooves 137 provided in the screws adjacently their hand wheels 129, said stops constituting opposite ends of a yoke-like member 138 fastened upon the block 125.

Preferably, the sight adjusting fixture 124 comprises a unit that is swingably carried on the gun mount 76 for quickly and conveniently positioning it in either the effective or the out-of-way position. To this end the block 125 is pivotally carried by the two branches 139 of an H-shaped member 140 which at its lower portion is hinged to a projection 141 on the jaw 97 as at 142, the out-of-use position of the sight shifter 124 being indicated in dot-and-dash lines in Fig. 14. When in use, the elevation of the device 124 with respect to the gun is determined by a pin 143 on the block 125 contacting the platform 18 of the receiver.

It is to be noted that the method and apparatus herein described provide for the correction or conditioning of the sights with reference to actual shot-recordings, that is, all the factors and peculiarities which in each gun determine the exact flight-line of the bullet are taken into full account. The gun-sights are thus corrected in each case with direct regard to the exact trajectory characterizing the gun.

Although the recording sheet has been stated as being 100 yards from the gun, this is merely by way of example, and the fact is that it may be located at any distance suitable for the purposes of the invention. For example, accurate results have been obtained by effecting the recordings at 100 feet, the sights in such case being aligned with a point 1⅞ inches below the central point of the recorded shots, and a size for the location finding frame of the telescope being properly chosen to represent a 1½ inch circle on the sheet.

The shots fired for testing the gun for proper functioning include, preferably, a first-fired shot having an overcharge of explosive to test the gun barrel and the breech mechanism for defects. Inasmuch as a defective gun may burst or backfire, a safety hood, not illustrated, is removably associable with the gun for the protection of the tester.

In Figure 19 is shown a clamp which may be employed instead of the resilient spike 93 for anchoring the gun to the head 86 of the recoil device 83. The clamp consists of an operating lever 145, pivoted at 146 to a lug 147 of the head 86, the lever having a finger piece 148 for conveniently operating it. To the lever 145 is articulated, by means of a pin 149, a bowed arm 150 of resilient material, having a hook-end 151 adapted to engage the front side of the strap-accommodating hole 94 in the gun stock 14. In the position of the clamp shown, the hook-end 151 of the arm presses resiliently against the front side of the hole 94, the bowed arm having been drawn toward the butt-end of the gun, by swinging the lever 145 toward the recoil device. It will be seen that the arm 150 and the lever 145 constitute an inside toggle which, in the effective position of the clamp, as shown, anchors the gun resiliently onto the head 86 of the recoil device. It will further be seen that the toggle assumes a locked position by being swung over center, but is releasable by forcing the lever 145 outwardly. Swinging the lever outwardly from the position shown, causes the hook-end of the arm 150 to move forwardly, the arm being then free to swing outwardly, and a spring 152, wrapped around the pin 149, being then effective to swing the arm clear of the gun for removal of the latter. The clamp is cast on by first placing the hook 151 in the hole 94, and then swinging the lever to the position shown in Figure 19.

It will be perceived that according to the invention the guns are preferably tested for proper functional or mechanical performance as part of the procedure for sighting them. This was previously not feasible because in preparation for sighting guns by the sharpshooting-method, it was necessary to limber-up and function test each gun by firing at least fifteen shots into a sand-pit. Therefore, while previously an average of thirty or more rounds of ammunition were necessary for function testing and sighting each gun, this is now accomplished with half that ammunition. Moreover, by the present invention it is possible to analyze the performance of the gun at any stage of the functional test, to determine whether or not the gun scatters the shots too widely or shoots otherwise wild. If the gun is wild it may be removed for correction before using all the ammunition out of the allotment for sight correction. If the gun is not wild, the entire fifteen shots may be fired, and the recordings of the shots used in connection with the location finder in the process of sight correction. A very marked saving of ammunition is thus achieved, so that together with the heretofore-mentioned great reduction in labor costs, made possible by the systematic and efficient sighting procedure, the total cost of sighting guns is reduced to a small fraction of what it has been heretofore.

The invention also reduces handling of the guns to a minimum and thus reduces proportionally the chances for accident.

What is claimed is:

1. A method for correcting a front and a rear sight relatively to each other, which consists of establishing with respect to the gun a point which bears a definite relation to the trajectory of a shot from the gun, associating with the gun, means comprising a correct sight definer for each of said sights, and a device for indicating by reference to said point for said definers relatively correct sight-defining positions, and adjusting said sight definers relatively to the gun in accordance with whatever relatively correct positions are called for by said indicating means by reference to said point.

2. A method for correcting sights on guns, which consists of establishing a point with respect to the gun, which point bears a definite relation to the trajectory of a shot from the gun, associating with this gun, for adjustment relatively thereto, sight-defining-means having means for indicating therefore, by reference to the said point, a correct sight-defining position, and adjusting said sight-defining means relatively to the gun in accordance with whatever correct sight-defining-position is called for by said indicating means by reference to said point.

3. A method of correcting sights on guns, which consists of conforming to a pattern a means including a location finder, mounting a gun requiring sight-correction, firing a shot from the mounted gun at a record sheet, applying said means adjacent the mounted gun and adjustable with respect therewith, and adjusting said means while so applied to conform the location finder in a certain respect to a point on the sheet struck by the shot fired from the said gun, said means by being so adjusted being effective to determine the required sight-correction for the gun in view of the pattern to which it is conforming.

4. A method of correcting sights on guns, which consists of conforming to a pattern means including a telescopic device having a location finder, mounting a gun requiring sight-correction, firing a shot from the mounted gun at a record sheet, applying the said means to the mounted gun for adjustment with respect to the latter, and adjusting said means while so applied to conform the location finder to a point on the record sheet struck by the shot fired from the gun, said means by being so adjusted being effective to determine the required sight-correction for the gun in view of the pattern to which it is conforming.

5. A method of correcting sights on guns which consists of producing a master gun with corrected front and rear sights, mounting the master gun and firing a shot from it at a record sheet, applying in significant association with the sights of the master gun a means including a telescopic device having a location finder, and conditioning said means to conform the location finder to the shot-spot on the record sheet, mounting a stock gun for sight correction and firing a shot from the mounted stock gun at a record sheet, associating said means with the stock gun while the latter is still mounted, and adjusting said means with respect to the mounted stock gun to conform the location finder to the point on the record sheet struck by the shot from the mounted stock gun, said means by being so adjusted being effective to determine the required sight-correction in conformity with the correct sight conditions of the master gun.

6. A method of correcting sights on guns having a front sight and a laterally adjustable rear sight, which consists of conforming to a corrected-sight pattern a means comprising, a location finder, rear sight defining means, and front sight defining means being separatable from the remainder of the means and comprising a member applicable proximate from the front sight for vertical adjustment, mounting a gun for sight-correction, firing a shot from the mounted gun at a record sheet, applying said adjustable member to the mounted gun proximate the front sight, mounting said remainder of said means near the front sight on said member, and upon the rear sight of said rear sight defining means in engagement with the adjustable rear sight of the mounted gun and, adjusting said means by aid of said location finder in respect to a shot spot made on the record sheet in said firing of the gun, by laterally adjusting the rear sight and vertically adjusting the adjustable member, and finishing the front sight to accord with the finally adjusted position of the adjustable member.

7. A method of testing guns and determining the necessary sight-correction, consisting of mounting a gun and firing a number of shots at a distant record sheet, for functional testing, predeterminately conforming to a corrected-sight pattern a means including a location finder, applying said means to the mounted gun and adjusting it in relation to the approximate center of the group of shot-spots on the record sheet produced in the functional test, said means by being so adjusted being effective to determine the required sight-correction in conformity with said pattern.

8. A method of analyzing guns for excessive scattering of shots and determining the necessary sight-correction, consisting of mounting a gun and firing a number of shots at a distant record sheet, for determining the grouping of the shots, setting to a pattern a means including a telescopic device having a finder for seeking out a small area, applying said means to the gun while the gun remains mounted, and adjusting said means while so applied to center the area finder upon the group of recorded shots on the record sheet, thereby to detect whether the gun is excessively scattering the shots and to determine the necessary gun-sight-correction for the gun in view of the pattern to which said means is conforming.

9. Apparatus for use in correcting a front and a rear gun-sight, comprising, means to establish with respect to the gun a point which bears a definite relation to the trajectory of a shot from the gun, a sight definer for each of said sights having provision for association with said sights and for adjustment relatively to the gun to define relatively correct sight conditions for the gun, and means for indicating by reference to said point, for said definers, relatively correct sight defining positions.

10. Apparatus for use in correcting gun-sights, comprising, means to establish with repsect to the gun a point which bears a definite relation to the trajectory of a shot from the gun, means having provision for association with the gun-sights and for adjustment relatively to the gun to define correct gun-sight conditions, and location-analyzing means for said associable means to determine thereby, by reference to said point, the necessary adjustment to render it definitive of correct gun sights in accord with a predetermined pattern of correct relations of said gun sights to said point.

11. Apparatus for use in correcting gun-sights, comprising, means to establish with respect to the gun a point which bears a definite relation to the trajectory of a shot from the gun, means having provision for association with the gun-sights and for adjustment relatively to the gun to define correct gun-sight conditions, and optical position-analyzing means for said associable means, having a location finder to indicate by reference to said point, for said associable means, a correct gun-sight-defining position to which it must be adjusted.

12. Apparatus for use in correcting gun-sights, comprising, means for mounting a gun for shooting, a sheet for recording shots, and means to determine the necessary sight-correction, comprising, a direction finder, means for associating said direction finder with the gun and for adjustment relatively thereto to conform the direction finder to a point on the record sheet struck by a shot from the gun while mounted, and means for defining the sights in their required relations to the adjusted direction finder, and, therefore, the recorded shot, in conformity with a predetermined pattern representing the required corrected sights in relation to said point.

13. Apparatus for use in correcting gun-sights, comprising, means for mounting a gun for shooting, a sheet for recording shots, and a device to determine the necessary sight correction, comprising, a telescope having a location finder, means for associating said telescope in adjacent relation to the gun and for adjustment in relation thereto to conform the location finder to a point on the record sheet struck by a shot, and means for defining the sights in their required corrected relations to the adjusted telescope, and, therefore, the recorded shot, in conformity with a predetermined pattern representing the required corrected sights in relation to said point.

14. Apparatus for use in correcting gun-sights, comprising a frame having means for mounting it on an adjustable rear gun-sight for adjustment therewith and on an adjustable member arranged proximate a front gun-sight, a telescope, a location finder for said telescope, a fixture having provision for support proximate the front gun-sight and provided with said adjustable member on which the frame has a part of its mounting, a mount to hold a gun for shooting, said frame being differently positionable for adjustments of the rear gun-sight and the adjustable member to enable the location finder to be brought into a relation of registration with a spot made by shooting while the gun is held in said mount, and means on said member effective to define the front sight in correct relation to the rear sight and said spot when said frame is adjusted to bring said location finder into said relation of registration with said spot.

15. Apparatus for use in correcting gun-sights, comprising a frame having means for mounting it on a rear gun-sight and on an adjustable member arranged proximate a front gun-sight, a telescope adjustably settable in the frame and having a location finder, a fixture having provision for support proximate the front gun-sight and provided with said adjustable member on which the frame has part of its mounting, and a mount to hold a gun for shooting, whereby movement of the rear gun-sight and the adjustable member will effect movement of the frame and enable the location finder to be brought into a relation of registration with a spot made by a shot from a gun held by said mount.

16. Apparatus for use in correcting gun-sights, comprising a frame having means for mounting it on a rear gun-sight and on an adjustable member arranged proximate a front gun-sight, a telescope adjustably settable in the frame and having a location finder, a fixture having provision for support proximate the front gun-sight and provided with said adjustable member on which the frame has part of its mounting, and a mount to hold a gun for shooting, said mount and said fixture being provided respectively with means for adjusting the rear gun-sight and the adjustable member whereby the location finder may be brought into a relation of registration with a spot made by a shot from a gun held by said mount.

17. Apparatus for use in correcting front and rear sights for guns, comprising, means for mounting a gun for shooting and sight correction, a sheet for recording a shot from the mounted gun, a device having provision for support proximate the front gun-sight and having a sight leveling gage adjustable for elevation in a side-straddling relation with the front sight, a direction finding device, and means for associating said device in such relation with said leveling gage and front sight, and for adjustment elevationally about the rear by the leveling gage, that with the gun mounted for sight correction said leveling gage is at a proper gun-sight level when it has been adjusted to bring the direction finder into a relation of a recording on a sheet made by a shot from a gun.

18. Apparatus for use in correcting gun-sights of stock guns by reference to a master gun, comprising, means for mounting said guns for shooting, sheet means for recording shots from said guns, and a pattern device comprising, a telescope having a location finder, and supporting means for the telescope having provision for application to the master gun in a defined relation to its sights and so that said device, when applied, supports said telescope with its location finder in a conforming relation with a shot recording made from the master gun, said device including means to render it applicable to and adjustable on the individually mounted stock guns to bring the location finder in each case into a relation of registration with a shot recording made by the particular stock gun, thereby to establish a position of said device on the stock gun which is definitive of corrected gun sights.

19. Apparatus for function-testing guns and determining sight correction therefore, comprising, means for mounting a gun to fire a number of shots and thereby function-testing it, sheet means to record the shots so fired for the purpose of sighting the gun with reference to the recorded shots, and means to determine the necessary sight correction, comprising, a direction finder and means to associate said direction finder in adjacent relation to the mounted gun and to adjust it to conform it to the group of recordings on the sheet means obtained by function-testing shots, said determining means comprising means for defining the corrected sights in a predetermined definite relation to the adjusted direction finder and therefore the recorded group of shots, to accord with a correct pattern.

20. Apparatus for use in correcting sights of guns, comprising, means for mounting each gun for shooting, sheet means for recording a number of shots from each gun, and means to determine the sight correction for each mounted gun, comprising, a telescope having an area-defining frame, and means to associate said telescope in adjacent relation to each mounted gun and to adjust it to bring said frame into centralized relation with a number of shots registered from the particular gun, said area-defining frame serving for detection of guns which scatter the shots over an objectionably wide area, said determining means including provision to define the corrected sights in a predetermined, definite relation to the adjusted telescope and therefore the recorded group of shots, to accord with a correct pattern.

21. A method of testing guns having a front sight and a laterally adjustable rear sight, and of correcting the sights, consisting of mounting a gun and firing a number of shots at a distant record sheet, for functional testing, predeterminately conforming to a corrected-sight pattern a means comprising, a location finder, rear sight defining means, and front sight defining means being separatable from the remainder of the means and comprising a member applicable proximate the front sight for vertical adjustment, applying said adjustable member to the mounted gun proximate the front sight, mounting said remainder of said means near the front sight on said member, and upon the rear sight with said rear sight defining means in engagement with the adjustable rear sight of the mounted gun, adjusting said means by aid of said location finder in respect to a group of shot recordings made on the record sheet in the functional testing, by laterally adjusting the rear sight and vertically adjusting the adjustable member, until said location finder is centralized upon the group of shot recordings, and finishing the front sight to accord with the position of the sight defined by the adjustable member.

22. Apparatus for use in correcting gun-sights of stock guns by reference to correct sights of a master gun, comprising, means for mounting said guns for shooting, sheet means for recording shots from said guns, a direction finding device, and means to support said direction finding device on the mounted master gun in a defined relation to its correct sights and in a position of registration with a shot recording made from the mounted master gun, said supporting means including means to render it applicable to and adjustable on the individually mounted stock guns in a manner to bring the direction finder in each case into a relation of registration with a shot recording made by the mounted, particular stock gun, thereby to establish a position for said supporting means on the stock gun which is definitive of corrected gun sights.

LE ROY B. FRASER.
EDGAR D. LAMBERT.